(12) United States Patent
Kodama et al.

(10) Patent No.: US 8,472,134 B2
(45) Date of Patent: Jun. 25, 2013

(54) AIR BEARING SURFACE OVERCOAT WITH SOFT INTERMEDIATE FILM, AND METHODS OF PRODUCING THE SAME

(75) Inventors: Mineaki Kodama, Odawara (JP); Hiroshi Ishizaki, Kanagawa (JP); Atsuko Okawa, Kanagawa (JP); Hiroshi Inaba, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/196,067

(22) Filed: Aug. 2, 2011

(65) Prior Publication Data
US 2013/0033779 A1 Feb. 7, 2013

(51) Int. Cl.
*G11B 5/127* (2006.01)

(52) U.S. Cl.
USPC .......................................... 360/110; 360/313

(58) Field of Classification Search
USPC .................................................. 360/110, 313
See application file for complete search history.

(56) References Cited

U.S. PATENT DOCUMENTS

| | | | |
|---|---|---|---|
| 4,335,744 A | 6/1982 | Bey | |
| 5,609,948 A | 3/1997 | David et al. | |
| 5,805,380 A | 9/1998 | Ishihara et al. | |
| 5,930,077 A | 7/1999 | Obata et al. | |
| RE37,294 E | * 7/2001 | Knapp et al. | 427/534 |
| 6,542,334 B2 | 4/2003 | Polycarpou et al. | |
| 7,495,865 B2 | 2/2009 | Chen et al. | |
| 7,782,569 B2 | 8/2010 | Cheng et al. | |
| 2008/0187781 A1 | 8/2008 | Cheng et al. | |
| 2008/0231992 A1 | 9/2008 | Cheng et al. | |
| 2008/0266715 A1 * | 10/2008 | Bhatia et al. | 360/235.4 |

FOREIGN PATENT DOCUMENTS

| | | |
|---|---|---|
| JP | 10-275308 | 10/1998 |
| JP | 2004-212824 | 7/2004 |
| JP | 2005-302185 | 10/2005 |
| WO | 95/23878 A1 | 9/1995 |

\* cited by examiner

*Primary Examiner* — Hoa T Nguyen
*Assistant Examiner* — Carlos E Garcia
(74) *Attorney, Agent, or Firm* — Zilka-Kotab, PC

(57) ABSTRACT

In one embodiment, a magnetic head includes at least one magnetic head element for reading from and/or writing to a magnetic medium, the element having an air bearing surface (ABS) facing toward a magnetic medium, an adhesive film including silicon nitride above the ABS having a characteristic of being formed under a water vapor partial pressure, and a protective film above the adhesive film, the protective film including carbon. Also, in another embodiment, a method includes forming an ABS of a magnetic head, the ABS being a surface of the magnetic head which is closest to a magnetic medium when in use, forming an adhesive film above the ABS of the magnetic head, the adhesive film being formed under a water vapor partial pressure, and forming a protective film above the adhesive film, the protective film including carbon.

22 Claims, 8 Drawing Sheets

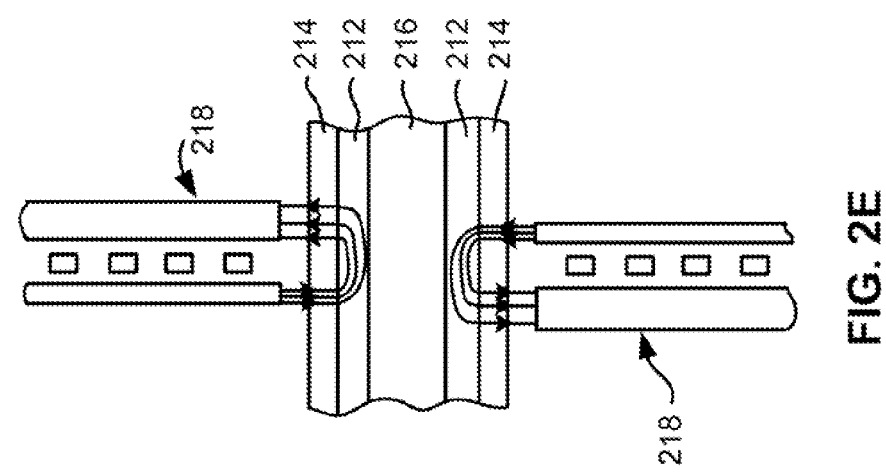
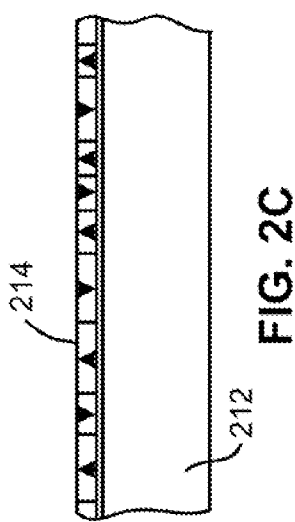
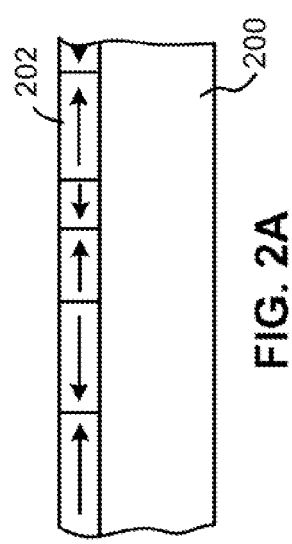
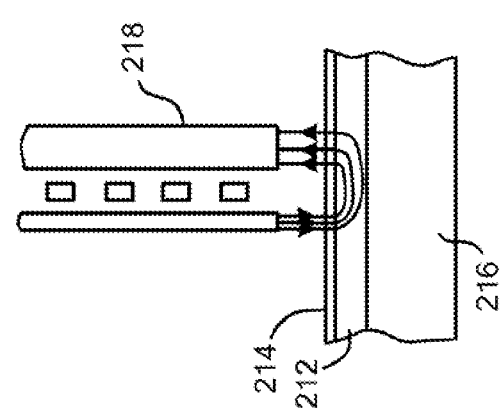
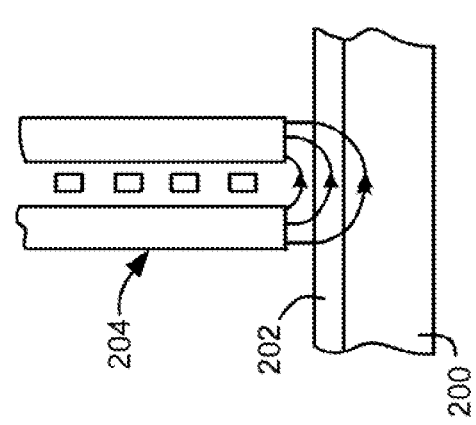

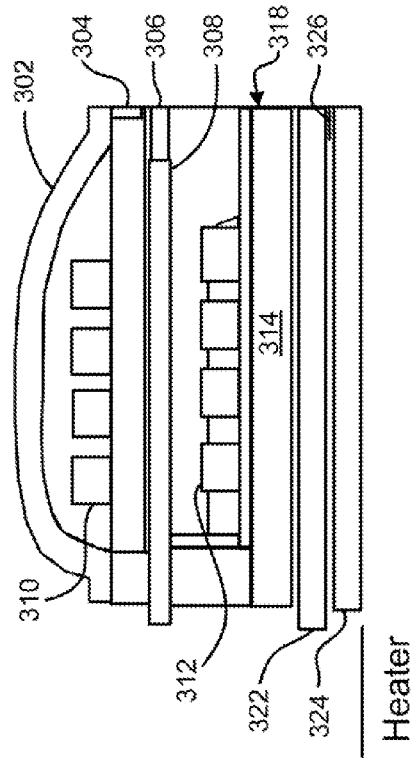
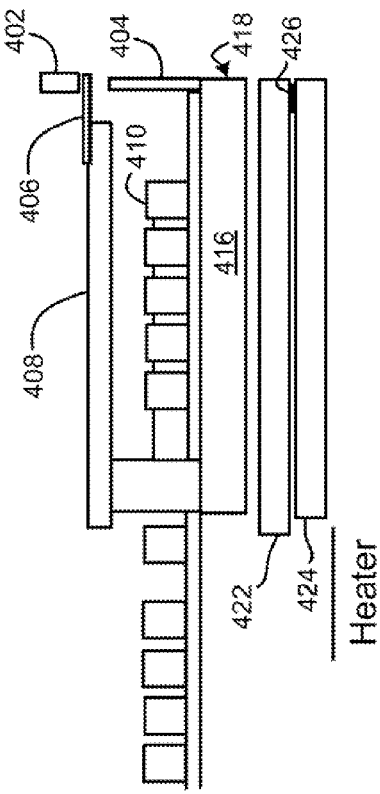
FIG. 3B
FIG. 4B
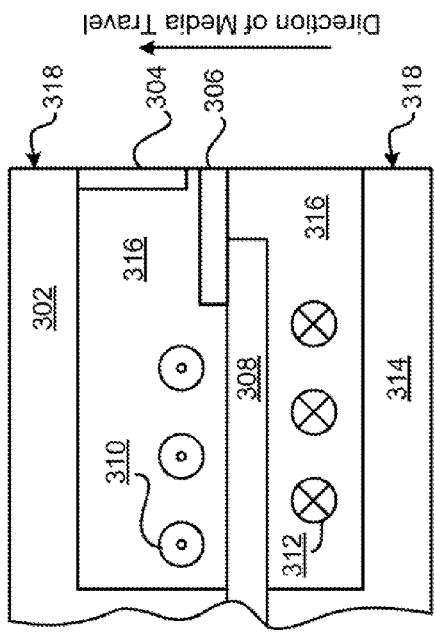
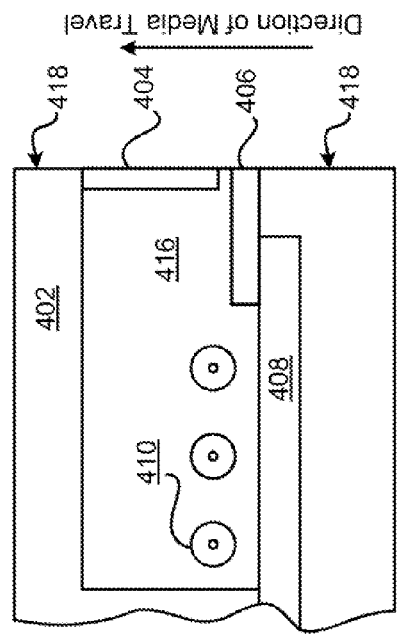
FIG. 3A
FIG. 4A

AIR BEARING SURFACE OVERCOAT WITH SOFT INTERMEDIATE FILM, AND METHODS OF PRODUCING THE SAME

FIELD OF THE INVENTION

The present invention relates to a magnetic recording head, and more specifically, to a magnetic recording head having an air bearing protective film or an air bearing surface overcoat used in a magnetic disk device.

BACKGROUND OF THE INVENTION

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the ABS, the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. In recent years there has been rapid development in increasing the recording densities for magnetic disk recording and playback devices to meet the increase in quantities of data handled. A key issue in achieving high recording densities is a reduction in the magnetic spacing, which is the distance between the magnetic head slider and the magnetic disk. However, when the magnetic spacing is reduced, the magnetic head slider is more likely to contact or impact the magnetic disk surface which rotates at high speed. For this reason, in addition to a thin and durable protective film being formed on the ABS of the magnetic head slider, high resistivity to wear is also important.

At the same time, magnetic resistance elements mounted on the magnetic head slider suffer from the disadvantage that the magnetic materials are susceptible to corrosion, and the air bearing protective film (ABPF) also needs to be able to prevent corrosion of the magnetic materials. In addition, when there is a difference in potential between the magnetic head and the magnetic disk, there is a problem where a discharge may occur between the magnetic head slider and the magnetic disk, damaging the magnetic resistance elements, and it is thus desirable that the ABPF also have the ability to protect against electrical discharges.

To satisfy these desired properties, a thin film which leaves no dust during sliding, has a low coefficient of wear, superior wear resistance, a high atomic density, and is chemically stable is preferable.

SUMMARY OF THE INVENTION

In one embodiment, a magnetic head includes at least one magnetic head element for reading from and/or writing to a magnetic medium, wherein the at least one magnetic head element includes an air bearing surface (ABS) facing toward the magnetic medium, an adhesive film above the ABS, the adhesive film having silicon nitride and a characteristic of being formed under a water vapor partial pressure, and a protective film above the adhesive film, the protective film including carbon.

In another embodiment, a method includes forming an air bearing surface of a magnetic head, the air bearing surface being a surface of the magnetic head which is closest to a magnetic medium when the magnetic head is in use, forming an adhesive film above the air bearing surface of the magnetic head, the adhesive film being formed under a water vapor partial pressure, wherein the adhesive film includes silicon nitride, and forming a protective film above the adhesive film, the protective film including carbon.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a magnetic head includes at least one magnetic head element for reading from and/or writing to a magnetic medium, wherein the at least one magnetic head element includes an air bearing surface (ABS) facing toward the magnetic medium, an adhesive film above the ABS, the adhesive film including silicon nitride and having a characteristic of being formed under a water vapor partial pressure, and a protective film above the adhesive film, the protective film including carbon.

In another general embodiment, a method includes forming an air bearing surface of a magnetic head, the air bearing surface being a surface of the magnetic head which is closest to a magnetic medium when the magnetic head is in use, forming an adhesive film above the air bearing surface of the magnetic head, the adhesive film being formed under a water vapor partial pressure, wherein the adhesive film includes silicon nitride, and forming a protective film above the adhesive film, the protective film including carbon.

Figure 1:
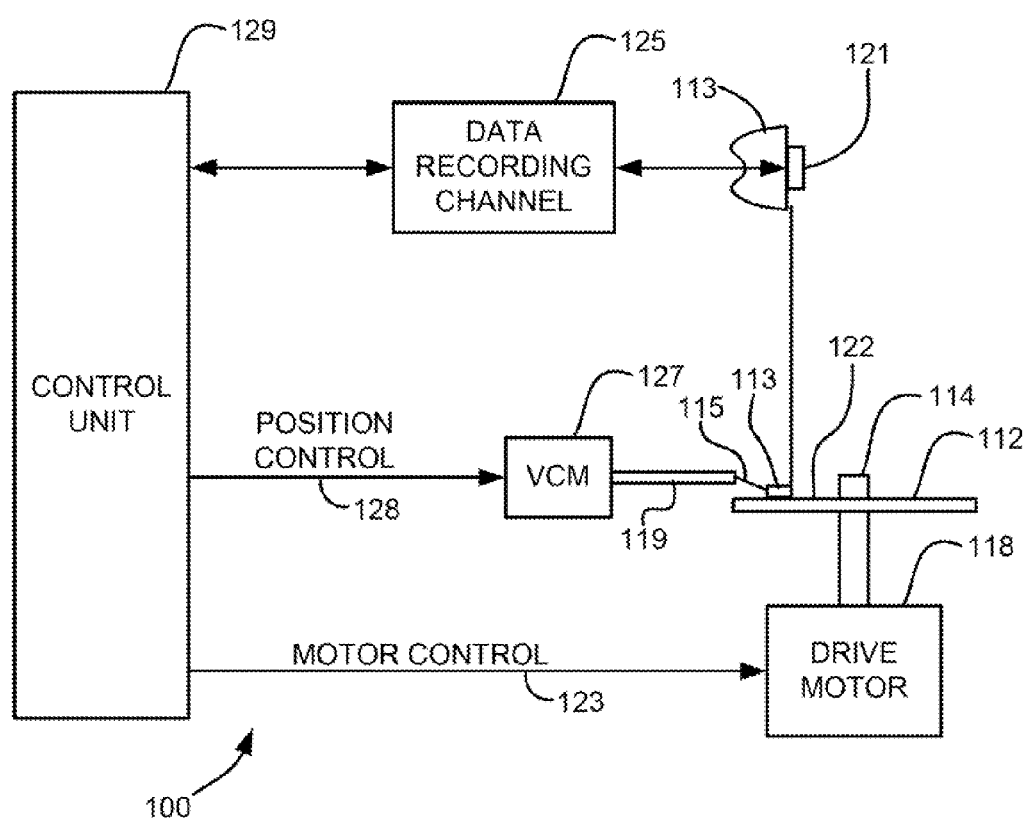
FIG. 1 is a simplified drawing of a magnetic recording disk drive system.

Referring now to the figures, in FIG. 1 there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an ABS of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The arrows in the magnetic layer 202 in FIG. 2A indicate the direction of the magnetization. The recording medium, a recording disc in this instance, comprises basically a supporting substrate 200 of a suitable non-magnetic material such as glass, with an overlying coating of a suitable and conventional magnetic layer 202.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetization substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
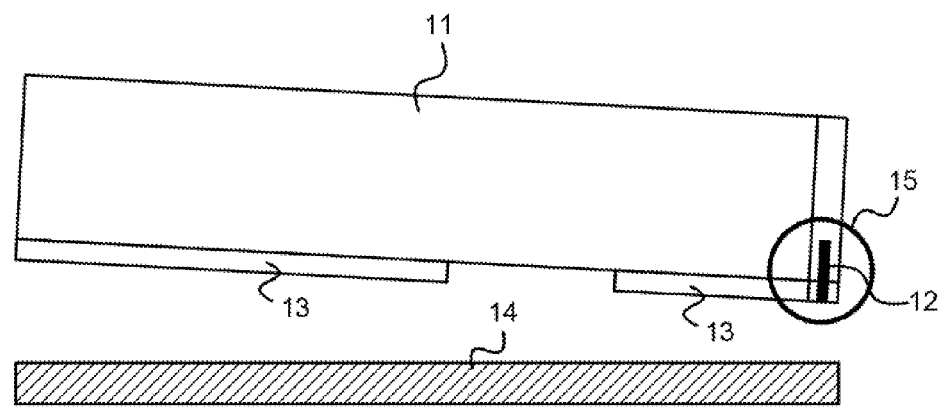
FIG. 5 is a cross-sectional view of one embodiment of a magnetic head slider having an air bearing surface protective film with a soft intermediate film.
Figure 6:
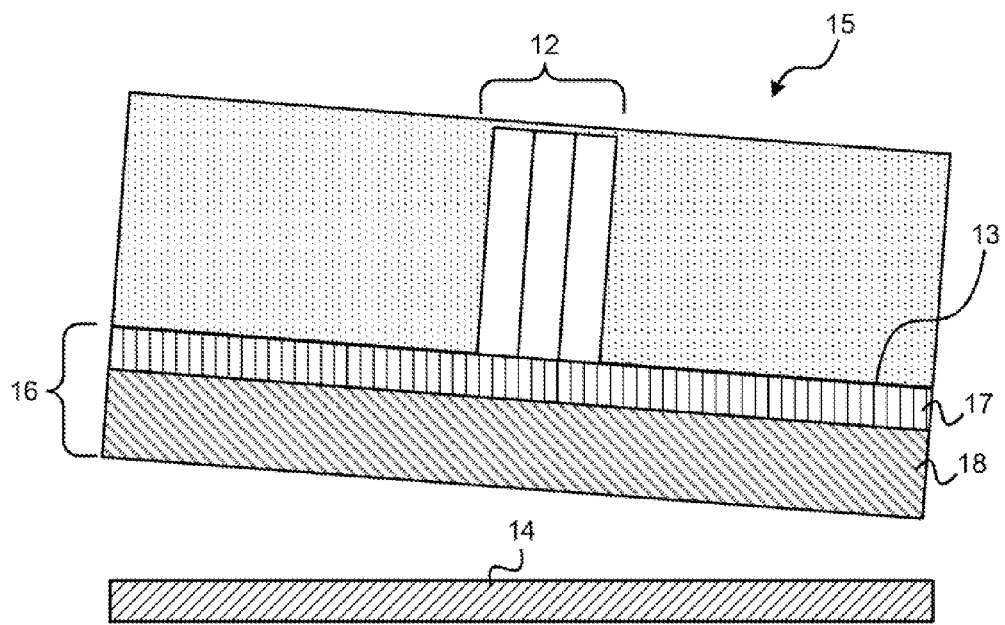
FIG. 6 is a cross-sectional view of one embodiment of a magnetic head tip taken from FIG. 5.

Referring now to FIGS. 5-6, carbon-based thin-film protective films are widely used as protective films in magnetic disk devices. They are used because they satisfy most of the desired properties for protective films. In particular, diamond-like carbon (DLC) films which have high density and hardness are typically used.

However, since the mechanical wear resistance and chemical corrosion resistance significantly deteriorate when the air bearing protective film (ABPF) 16 is peeled away, it is common to have an adhesive film 17 as the lowest layer of the ABPF 16 with the purpose of improving adhesion between the ABPF 16 and the magnetic ABS 13. A silicon film is most commonly used as this adhesive film 17. Thus, the so-called ABPF 16 is generally a dual layer structure comprising a lower adhesive film 17 and an upper surface protection film 18, the material most widely used for the adhesive film 17 being silicon, with DLC commonly used for the surface protection film 18.

In tandem with the development in high recording densities in recent years, a requirement has arisen for a further reduction in the distance between the magnetic head slider and the magnetic disk, causing further reductions in the thickness of the ABPF 16. The silicon film currently used as the adhesive film 17 for the ABPF 16 suffers a rapid reduction in density at thicknesses of less than about 2.0 nm, which also brings about deterioration in corrosion resistance and electrical insulation properties.

In one approach, the above problems with conventional magnetic head designs may be resolved by employing a dense film of silicon nitride as the adhesive film 17. For example, the silicon used conventionally has a bulk density of 2.0 g/cm$^3$, but some approaches may utilize silicon nitride with a bulk density of approximately 3.2 g/cm$^3$. Embodiments employing denser silicon nitride films may provide superior corrosion resistance because denser films contain fewer pinholes after ABS formation. The corrosion resistance of the ABPF 16 is greatly influenced by the number of pinholes present when the ABPF 16 is formed, and the dense silicon nitride film is able to offer an ABPF 16 with superior corrosion resistance. Moreover, silicon nitride is an insulator which has a high electrical resistance, and compared to the silicon used in conventional heads, it is able to offer an ABPF 16 with superior electrical resistance.

Conventional adhesive films of silicon nitride having a density of greater than about 2.6 g/cm$^3$ and containing more than about 45% silicon have been utilized to form an ABPF 16, as described in detail in U.S. Pat. No. 4,335,744.

According to the prior art, an ABPF 16 formation method may be described. First, the magnetic head is transported to a vacuum chamber and air is exhausted therefrom. Thereafter, ABS etching processes are carried out using an argon or another noble gas plasma or an ion beam in order to form an ABS 13. Following this, an adhesive film 17 is formed using a reactive sputtering method. In the conventional method, a sputtering gas with argon partial pressure of about 60% and nitrogen partial pressure of about 40% is introduced into the vacuum chamber, with a high-frequency power source (RF) then supplied to generate a plasma, the generated plasma being used to form the film by sputtering with a silicon target. A DLC film 18 is formed as the surface protection film using cathodic vacuum arc discharge deposition.

To further reduce magnetic spacing, thermal fly-height control (TFC) technology may also be used. TFC expands the vicinity of the magnetic element using a heater, and is a technique which, in addition to compensating for unevenness in the clearance of the magnetic head slider, is able to bring the distance between the magnetic head slider and the magnetic disk close to the absolute minimum. This TFC technology is an extremely effective technique for reducing the magnetic spacing. However, as local thermal expansion is used in the vicinity of the magnetic element to bring the magnetic head slider closer to the magnetic disk, the area of contact during contact between the magnetic head slider and the magnetic disk is extremely small causing a relatively higher load on the ABPF 16. As a result, wear is more likely to occur in the ABPF 16.

For magnetic heads employing TFC technology, film thickness is thus constrained by the hardness and density of the materials of construction, and it has become clear that even when a denser conventional ABPF 16 is used which contains a silicon nitride adhesive film 17 and a DLC protective film 18 as described above, film thickness cannot be reduced without fatal deterioration to wear resistance. Thus, it is one goal of the present description to provide an ABPF 16 having a sufficient wear resistance to withstand the impact forces of TFC technology at film thicknesses lower than presently capable using conventional ABPF 16 designs.

A magnetic head, according to one embodiment, includes a dual-layer structure in which the ABPF 16 includes an adhesive film 17 and a surface protection film 18, with at least a magnetic recording element and magnetic playback element being formed on a substrate. The substrate may be provided with a single ABS on a magnetic recording element and magnetic playback element.

In some embodiments, the magnetic playback element may be provided with an adhesive film 17 that includes a soft film acting as a buffer layer to moderate the impact forces, resulting from contact between the magnetic head slider and the magnetic disk. Silicon nitride films including oxygen and hydrogen ($SiN_xO_yH_z$) are one exemplary material for use as the adhesive film 17 capable of acting as a buffer layer in a magnetic head.

Conventional designs using adhesive film 17 of SiN problematically experience wear when the magnetic head slider and the magnetic disk come into contact. Because magnetic films of $SiN_xO_yH_z$ are softer than conventional SiN films, they deform during contact between the magnetic head slider and the magnetic disk, thereby moderating the impact forces acting on the ABPF 16 and reducing wear thereon. Thus, at least some embodiments of a magnetic head provided with an ABPF 16 may utilize one or more magnetic films of $SiN_xO_yH_z$ in order to mitigate impact forces between the magnetic disk and magnetic head slider, and reduce any resulting wear.

According to one exemplary embodiment, a layer of $SiN_xO_yH_z$ has approximately equivalent density as conventional SiN films, and may thus be manufactured to the same film thickness as in conventional SiN films. Therefore, it is possible to improve wear resistance of the ABPF 16 with correspondingly negligible degradation of magnetic spacing within the magnetic head structure.

FIG. 5 shows a schematic view of a magnetic head slider 11, according to one embodiment. As shown, the magnetic head slider 11 may be positioned to face the magnetic disk 14, which essentially includes a magnetic recording medium. In this arrangement, the ABS 13 is a surface on the magnetic disk 14 side of the magnetic head slider 11. Data is read from and/or written to the magnetic disk 14 by a magnetic head element 12 formed on the tip of the magnetic head slider, an area designated by circle 15.

FIG. 6 is a close-up schematic view of the above described magnetic head tip 15, according to one embodiment. The ABPF 16 may be formed on the ABS 13, and in the exemplary embodiment shown in FIG. 6, the ABPF 16 is formed in a dual-layer structure including an adhesive film 17 and a surface protection film 18. Furthermore, a surface protection film 18 of the ABPF 16 may be positioned on a side closer to the magnetic disk 14.

In another embodiment, the adhesive film 17 may be positioned on parts of the magnetic head 11 that periodically contact the ABS 13. As shown in the exemplary embodiment of FIG. 6, the adhesive film 17 may be formed of $SiN_xO_yH_z$, and the surface protection film 18 may be formed of DLC. Of course, other materials having similar bulk density and hardness to films formed of $SiN_xO_yH_z$ may be employed, as would be understood by one having ordinary skill in the art upon reading the present descriptions.

An exemplary process for forming a magnetic head with an ABPF 16 is now described. In one approach, a magnetic head 11, which may be characterized as having a bar or slider shape, is first transported into a vacuum chamber, which is evacuated. In preferred embodiments, the ABS is subsequently subjected to an etching process using a plasma of argon or other noble gas, an ion beam, or according to other comparable etching methods as would be understood by those having ordinary skill in the art upon reading the present descriptions. This etching process removes layers that were altered and/or oxidized while processing the magnetic head ABS.

Continuing with the exemplary approach, an adhesive film 17 is then formed on ABS 13 of the magnetic head 11. This adhesive film 17 may be formed of $SiN_xO_yH_z$, and may be formed into a film using reactive sputtering. Of course, other materials and additional elements may be included in this layer. In the exemplary approach, a sputtering gas mixture including about 60% partial pressure of argon, about 39% partial pressure of nitrogen and about 1% partial pressure of water vapor is introduced into the film-forming chamber, with high-frequency power (RF) subsequently being supplied to generate a plasma in the vacuum chamber. The plasma thus generated is next used to form a film of SiN on the ABS 13 by sputtering, with silicon as a target.

In one embodiment, introducing water vapor into the vacuum chamber may be obtained, at least in part, by momentarily exposing the vacuum chamber to ambient atmospheric conditions, causing moisture to be absorbed on the inside wall of the vacuum chamber. The adhesive film 17 formation process above may then be executed without removing this moisture.

Moreover, in some approaches it is possible to form a $SiN_xO_yH_z$ layer with the same properties as embodiments described above when using SiN that has already been nitrided as a sputtering target.

In additional embodiments, other methods may be combined with the above reactive sputtering method to form the adhesive film 17 including $SiN_xO_yH_z$. For example, a $SiN_xO_yH_z$ film may be formed with the same properties as described above even when using ion beam film forming techniques, such as ion beam assisted sputtering (IBAS).

In one particular embodiment, a surface protection film 18 including DLC may be formed after the adhesive film 17. The DLC may be formed into a film on adhesive film 17 by employing cathodic vacuum arc discharge deposition, laser ablation deposition, mass selective ion beam deposition, ion beam deposition methods, or other equivalent methods as would be appreciated by one having ordinary skill in the art upon reading the present descriptions.

In still another embodiment, adhesive film 17 and surface protection film 18 are formed in the same vacuum chamber. Where adhesive film 17 and surface protection film 18 are to be formed in the same vacuum chamber, the surface protection film 18 also includes oxygen and hydrogen to avoid immediate deterioration of the water vapor partial pressure when the introduction of water vapor ceases. Thus, even at the point where the surface protection film 18 is formed following on from the adhesive film 17 the partial pressure continues at the same level as that when the adhesive film 17 was formed.

EXPERIMENTAL RESULTS

Generally speaking, a micro scratch test is a method of measuring the friction response of a surface. More specifically, it is a method of observing friction response(s) when a hemispherical diamond stylus, attached to the tip of a cantilever, is pressed against a test surface being drawn in one direction, and the stylus is made to oscillate in parallel with this test surface. Furthermore, a load is placed on the stylus and sequentially increased until the thin film peels away or breaks, as indicated by a rapid increase in the frictional response due to the particles generated by the wear. Thus, it is possible to determine the load at which the thin film peels or breaks, also known and referred to hereafter as the "peel point," by using a micro scratch test. The results of several such tests are reproduced herein to illustrate the comparative properties of magnetic heads according to the prior art and magnetic heads with an ABPF, as disclosed in the present descriptions.

Figure 7:
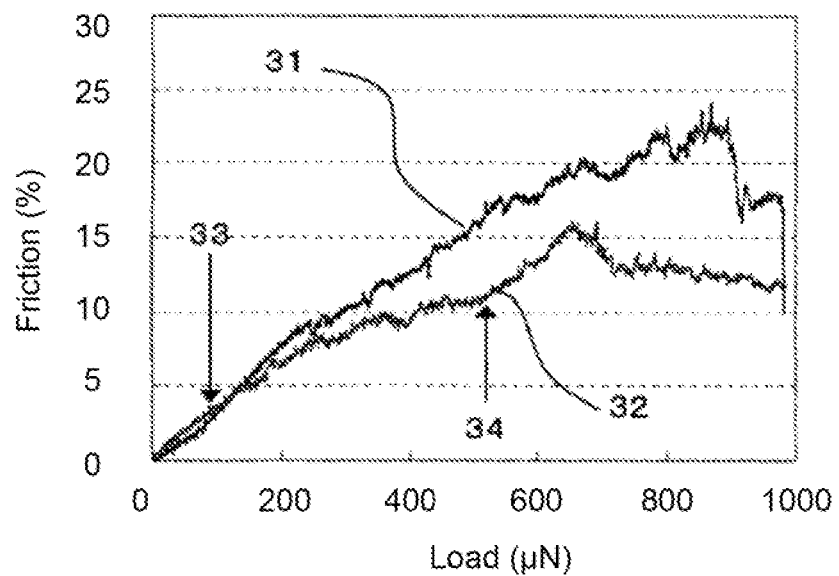
FIG. 7 is a graphical representation of micro scratch test results for one embodiment of a magnetic head with an air bearing surface protective film having a soft intermediate film, compared against the prior art.

FIG. 7 shows the results of a micro scratch test where an ABPF is formed on a silicon wafer, according to one embodiment. In this experiment, curve 31 shows results observed when using a conventional adhesive film of silicon nitride (such as SiN) and having a surface protection film of DLC, as according to prior art. On the other hand, curve 32 shows results observed for one exemplary embodiment of a magnetic head with an ABPF including an adhesive film comprising $SiN_xO_yH_z$, and a surface protection film comprising DLC, as disclosed in the present descriptions. In both the conventional example and the exemplary embodiment, the film thickness of the $SiN_xO_yH_z$ was about 0.5 nm, and the film thickness of the DLC was about 1.5 nm.

The conventional magnetic head friction response, represented by curve 31, experiences a drastic increase at datapoint 33, indicating that peeling or breakdown occurs at that approximately 100 µN. On the other hand, with curve 32 comparatively representing one embodiment, the peel point occurs at datapoint 34, with a corresponding load of approximately 500 µN. With a larger peel point indicating greater wear resistance, it is clear from the results of the above experiment that an ABPF using a $SiN_xO_yH_z$ as an adhesive film has a much greater wear resistance than the conventional ABPF using silicon nitride as an adhesive film.

Auger electron spectroscopy detects an Auger electron stimulated by a beam of electrons, and is a method of analysis that obtains data on the elemental composition present in the surface of test materials. Where the DLC film is scratched by the diamond stylus in the scratch test device, the DLC film is reduced. By observing changes in the concentration of carbon atoms along the traces of the scratch test, it is possible to know the changes in the film thickness of the DLC film, which allows an estimation to be made from the scratch test of the load at which peeling or breakdown occurs.

Figure 8:
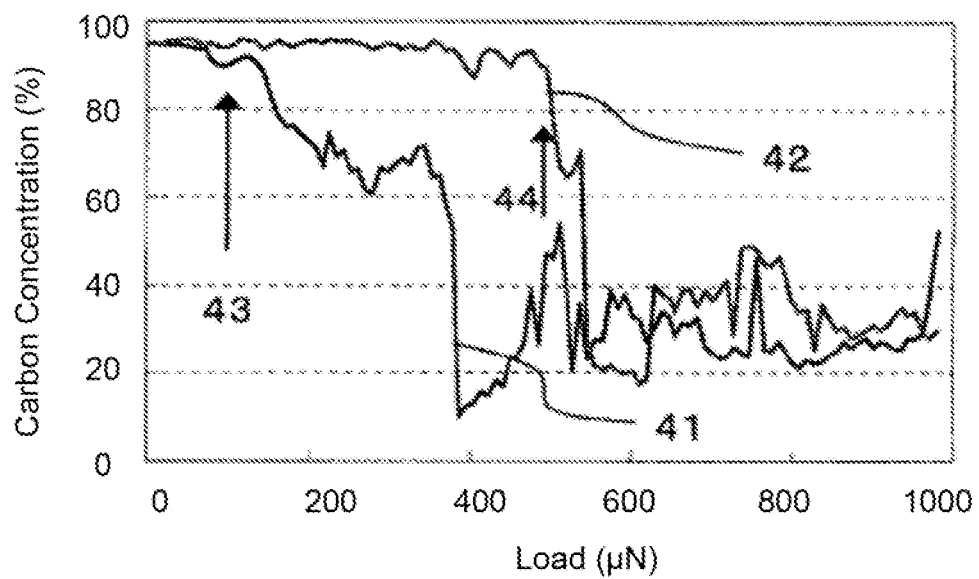
FIG. 8 is a is a graphical representation of Auger electron spectroscopy test results for one embodiment of a magnetic head with an air bearing surface protective film with a soft intermediate film, compared against the prior art.

FIG. 8 shows the results of analyzing the scratch marks of the micro scratch test in FIG. 7 using Auger electron spectroscopy. Curve 41 shows the results of analysis where the adhesive film is conventional silicon nitride, and the surface protection film is DLC. Curve 42 shows the results of analysis where the adhesive film comprises $SiN_xO_yH_z$, and the surface protection film comprises DLC.

In general, a drop in the carbon concentration is seen where the load exceeds the "peel point," a threshold indicating that peeling or breakdown has occurred. In FIG. 8, curve 41 shows the conventional film, according to the prior art, with an observed peel point at datapoint 43, or approximately 100 µN. On the other hand, in curve 42, which illustrates one embodiment of the invention, the peel point is approximately 500 µN, as observed at datapoint 44.

The results of observing the peel point using Auger electron spectroscopy match the results of observation of the peel point from the scratch test in FIG. 7, with the Auger electron spectroscopy results supporting the fact that an ABPF comprising $SiN_xO_yH_z$ as an adhesive film has a higher wear resistance than a conventional ABPF with silicon nitride as an adhesive film.

Table 1 below shows the comparative density and hardness for an adhesive film including $SiN_xO_yH_z$ as described herein, and a conventional silicon nitride adhesive film formed on a silicon wafer. The film thickness in both cases was about 50 nm.

TABLE 1

Comparative Film Hardness and Density

|  | Hardness (GPa) | Density (g/cm³) |
| --- | --- | --- |
| $SiN_xO_yH_z$ | 19.6 | 2.7 |
| SiN (prior art) | 23.1 | 2.9 |

In the exemplary embodiment, the hardness of $SiN_xO_yH_z$ films was lower than for conventional silicon nitride films (about 19.6 GPa as opposed to about 23.1 GPa, respectively). Additionally, the densities of the $SiN_xO_yH_z$ films were lower than for conventional silicon nitride films (about 2.7 g/cm³ as opposed to about 2.9 g/cm³, respectively). Thus, $SiN_xO_yH_z$ films as disclosed herein are softer than conventional films of silicon nitride.

A density greater than about 2.6 g/cm³ generally provides sufficient corrosion resistance for an adhesive film, and therefore it is possible to use adhesive films including $SiN_xO_yH_z$ with a thickness equal to those in conventional silicon nitride films, thus conferring improvements to wear resistance without any corresponding deterioration in the magnetic spacing.

Figure 9:
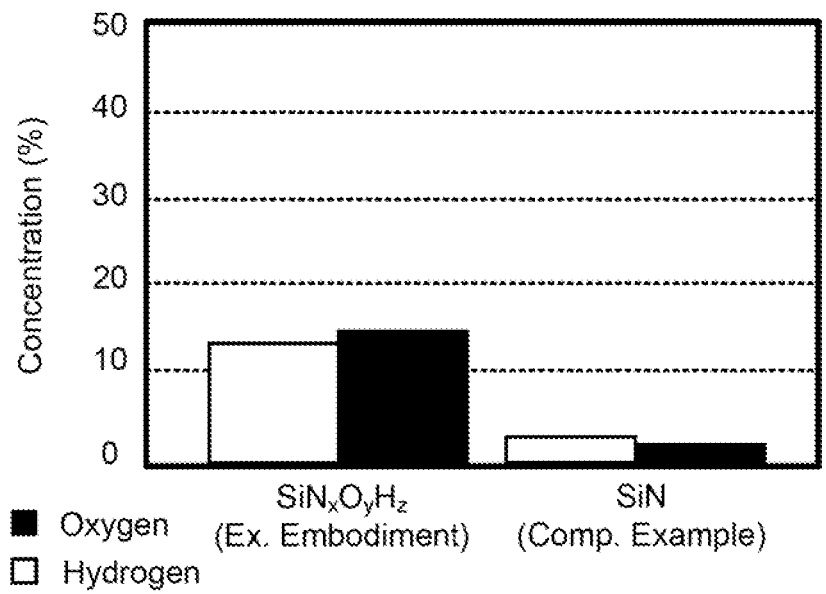
FIG. 9 is a graphical representation of oxygen and hydrogen concentrations observed in one embodiment of an adhesive film of a magnetic head with an air bearing surface protective film having a soft intermediate film, compared against the prior art.
Figure 10:
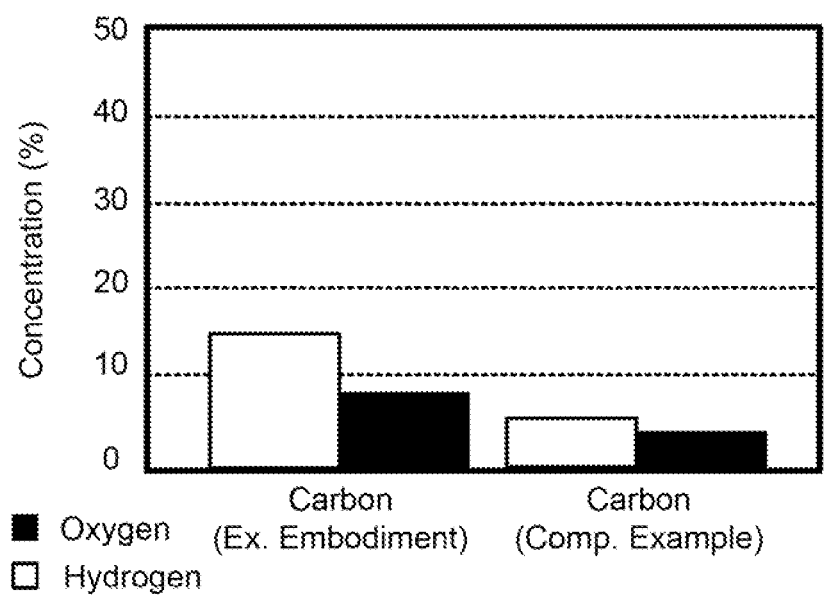
FIG. 10 is a graphical representation of oxygen and hydrogen concentrations observed in one embodiment of the air bearing surface protective film having a soft intermediate film of a magnetic head, compared against the prior art.

FIG. 9 shows results of a Rutherford back scattering (RBS) analysis and elastic recoil detection analysis (ERDA) using an energy ion beam analysis device. Each analysis measures the amount of oxygen contained in the adhesive film, with FIG. 10 showing oxygen quantities in the corresponding surface protection film observed when using the two above analyses. These analyses compared an ABPF formed using the processes described herein against an ABPF formed using a conventional process. The samples were formed on a silicon wafer.

The ABPF disclosed herein includes a surface protection film with an adhesive film comprising $SiN_xO_yH_z$ and surface protection film comprising DLC. The adhesive film and the DLC film may be formed in the same chamber, so that the DLC film has a water vapor partial pressure equivalent to that during formation of the adhesive film. On the other hand, the conventional ABPF has an adhesive film of silicon nitride (such as SiN) and a surface protection film of DLC. The film thickness was 0.6 nm for the adhesive film and 1.8 nm for the surface protection film for both the comparative exemplary embodiment and the comparative conventional example.

A comparative analysis of the conventional adhesive film of silicon nitride and an exemplary embodiment of an adhesive film comprising $SiN_xO_yH_z$, was conducted, with results shown in FIG. 9. In particular, the amount of hydrogen observed in the conventional silicon nitride film was about 3%, whereas the amount of hydrogen observed in the comparative embodiment was about 12%. Therefore, the exemplary embodiment contained more hydrogen than the conventional example. Moreover, where the amount of oxygen observed in the conventional silicon nitride film was about 2.5%, the corresponding amount of oxygen contained in the exemplary embodiment was about 13%, showing a relatively large amount of oxygen in the exemplary embodiment adhesive film as compared to the comparative example. Thus, an adhesive film of $SiN_xO_yH_z$ as described herein, is properly characterized as containing more hydrogen and oxygen than conventional silicon nitride films.

In one embodiment, it may be beneficial to include oxygen in the adhesive film having a concentration in a range from about 5% to about 13%. In another embodiment, it may be beneficial to include hydrogen having a concentration in a range from about 6% to about 12% in the adhesive film.

Similarly, a comparative analysis of conventional surface protection film and one exemplary embodiment of a surface protection film of DLC is shown in FIG. 10. Notably, whereas the amount of hydrogen observed in the conventional DLC film was about 4%, the amount of hydrogen observed in the DLC film of the exemplary embodiment was about 15%, showing a relatively large amount of hydrogen in the protective film of the exemplary embodiment. Moreover, whereas the amount of oxygen observed in the conventional surface protection film was about 3%, the amount of oxygen observed in the DLC film of the exemplary embodiment was about 8%, showing a relatively greater amount of oxygen in the protective film of the exemplary embodiment. Thus, the surface protection film of the exemplary embodiment is properly characterized as having a relatively large amount of hydrogen and oxygen as compared to conventional protective films. This effect may be accomplished by applying a vapor partial pressure while forming the adhesive film 17 described herein.

In one embodiment, it may be beneficial to include oxygen in the protective film having a concentration in a range from about 5% to about 8%. In another embodiment, it may be beneficial to include hydrogen having a concentration in a range from about 6% to about 15% in the protective film.

Figure 11:
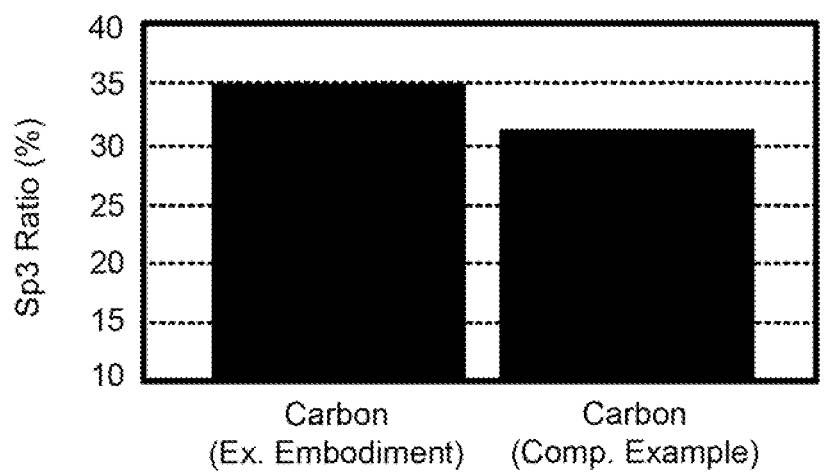
FIG. 11 is a graphical representation of sp3 bonding ratios observed in one embodiment of the air bearing surface protective film having a soft intermediate film of a magnetic head, compared against the prior art.

FIG. 11 shows the results of x-ray electron spectroscopy measuring the proportion of sp3 bonding in the DLC film. In general, the DLC film is known to include an sp3 bond and a graphite sp2 bond. Furthermore, materials generally increase in density and hardness with increasing amounts of sp3 bonding. As shown in FIG. 11, approximately 31% of bonds in the conventional protective film exhibit sp3 bonding profiles, while the sp3 bonding ratio in the protective film of the exemplary embodiment is approximately 35%. This indicates that the protective film of the exemplary embodiment is denser and harder than conventional surface protection film.

Figure 12:
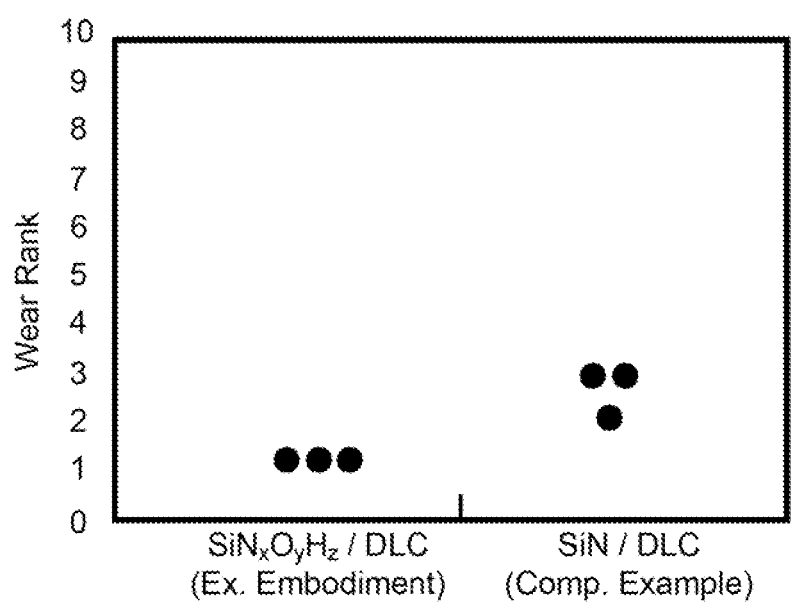
FIG. 12 is a plot comparing a wear rank of one embodiment of a magnetic head having an air bearing surface protective film with a soft intermediate film against the prior art.

FIG. 12 shows the results of wear resistance testing for the magnetic head slider, according to one embodiment. In this test, the ABS of the magnetic head slider was mounted on an HDD and deliberately brought into contact with the magnetic disk. The resulting degree of wear on the ABPF is subsequently observed using a scanning electron microscope, and scored on a scale from 0 to 10, with 0 indicating no observed wear. Experimental results reveal that conventional ABPF designs having an adhesive film of SiN about 0.5 nm thick and a surface protection film of DLC film about 1.5 nm thick had an impressive wear ranking of 2 and 3. In comparison, the ABS protection film of the exemplary embodiment having an adhesive film comprising $SiN_xO_yH_z$ having a thickness of about 0.5 nm, and a surface protection film comprising DLC having a thickness of about 1.5 nm had a corresponding ranking of 1. Thus, the ABPF designs disclosed herein according to various embodiments have superior wear resistance as compared to conventional ABPF designs.

Figure 13:
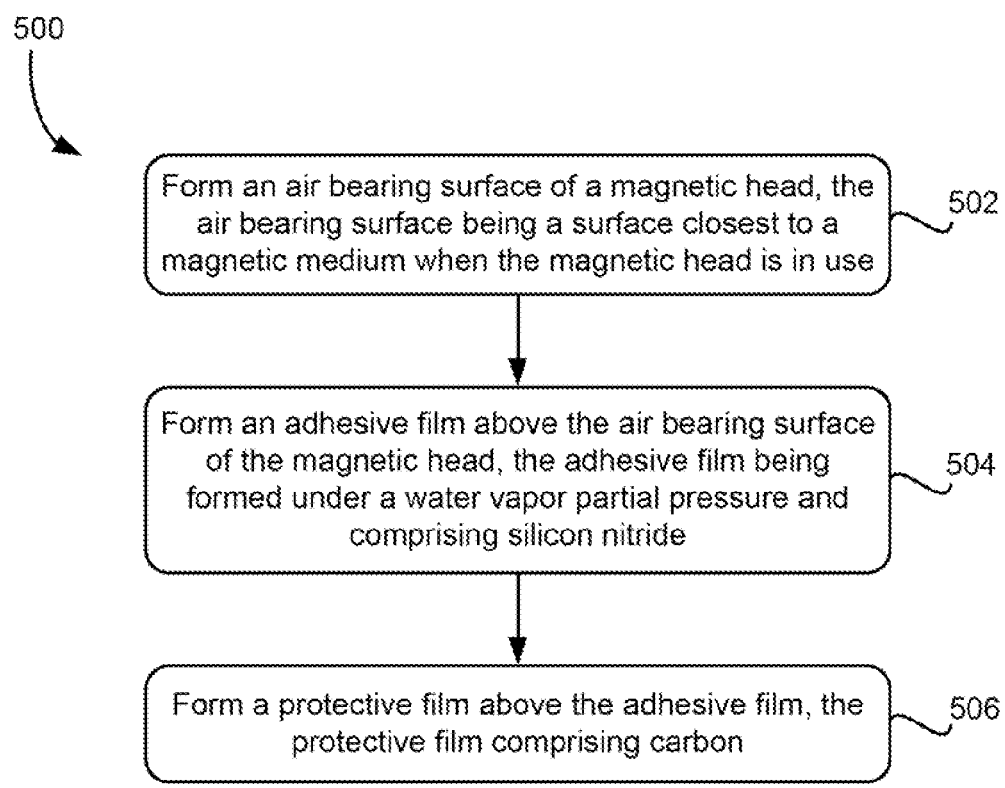
FIG. 13 is a flowchart of a method, according to one embodiment.

FIG. 13 shows a flowchart of a method 500 for producing an ABPF, according to one embodiment. The method 500 may be carried out in any desired environment, including those shown in FIGS. 1-6, according to various embodiments. Of course, more or less operations than those specifically described below may be included in the method 500 according to various embodiments.

In operation 502, an ABS of a magnetic head is formed, the ABS being a surface of the magnetic head which is closest to a magnetic medium when the magnetic head is in use.

In operation 504, an adhesive film is formed above the ABS of the magnetic head, the adhesive film being formed under a water vapor partial pressure, wherein the adhesive film comprises silicon nitride.

In one approach, the adhesive film may be formed in a gas mixture comprising about 60% partial pressure of argon, about 39% partial pressure of nitrogen, and about 1% partial pressure of water vapor. Further, in some approaches, the adhesive film may be formed using at least one of: reactive sputtering and ion beam assisted sputtering.

In one embodiment, the adhesive film may comprise $SiN_xO_yH_z$, wherein x, y, and z have a relationship such that a concentration of O is greater than about 5% and a concentration of H is greater than about 6%. In another embodiment, the concentration of O may be greater than about 10% and the concentration of H may be greater than about 10%.

According to another embodiment, the concentration of O may be greater than about 10%, more preferably 13%, etc., and the concentration of H may be greater than about 10%, more preferably 12%, etc.

In one embodiment, the adhesive film may have a density from about 2.6 g/cm$^3$ to about 2.8 g/cm$^3$, such as about 2.7 g/cm$^3$, and may further have a hardness of about 19.5 GPa, in one approach.

In operation 506, a protective film is formed above the adhesive film, the protective film comprising carbon. According to one embodiment, the protective film may comprise DLC or some other suitable material, wherein a concentration of oxygen in the DLC is greater than about 5%, more preferably 8%, etc., and a concentration of hydrogen in the DLC is greater than about 6%, more preferably 10%, even more preferably 15%, etc.

In one approach, the protective film may be formed in a gas mixture comprising about 60% partial pressure of argon, about 39% partial pressure of nitrogen, and about 1% partial pressure of water vapor. Further, in some approaches, the protective film may be formed using at least one of: reactive sputtering, laser ablation, cathodic vacuum arc discharge deposition, and mass selective ion beam deposition.

From the above results, it is possible to provide an ABPF with a high wear resistance without any deterioration in the magnetic spacing by using $SiN_xO_yH_z$ as the adhesive film. Moreover, since the amount of oxygen and hydrogen included in the surface protection film is higher than for a conventional surface protection film, a film with a greater density and hardness may be obtained. Moreover, as the surface protection film includes hydrogen, the structure of the uppermost surface of the carbon film terminates in a carbon-hydrogen bond, lowering the surface energy of the surface protection film when compared to a conventional surface protection film, and as a result, a reduction in absorption of lubricant agents is observed.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
   at least one magnetic head element for reading from and/or writing to a magnetic medium, wherein the at least one magnetic head element comprises an air bearing surface (ABS);
   an adhesive film above the ABS, the adhesive film comprising silicon nitride and having a characteristic of being formed under a water vapor partial pressure; and
   a protective film above the adhesive film, the protective film comprising carbon,
   wherein the characteristic of being formed under the water vapor partial pressure is that the adhesive film comprises $SiN_xO_yH_z$, wherein x, y, and z have a relationship such that a concentration of O is in a range from about 5% to about 13% and a concentration of H is in a range from about 6% to about 12%.

2. The magnetic head as recited in claim 1, wherein the protective film is more wear resistant than a protective film of the same material formed above an adhesive layer of silicon nitride that does not have a characteristic of being formed under a water vapor partial pressure.

3. The magnetic head as recited in claim 1, wherein the protective film comprises diamond-like carbon (DLC), wherein a concentration of oxygen in the DLC is in a range from about 5% to about 8% and a concentration of hydrogen in the DLC is in a range from about 6% to about 15%.

4. The magnetic head as recited in claim 1, wherein the adhesive film has a density from about 2.6 g/cm$^3$ to about 2.8 g/cm$^3$.

5. The magnetic head as recited in claim 1, wherein the adhesive film has a density of about 2.7 g/cm$^3$ and a hardness of about 19.5 GPa.

6. A magnetic data storage system, comprising:
   at least one magnetic head as recited in claim 1;
   the magnetic recording medium;
   a drive mechanism for passing the magnetic medium over the at least one magnetic head; and
   a controller electrically coupled to the at least one magnetic head for controlling operation of the at least one magnetic head.

7. A method for forming the magnetic head as recited in claim 1, the method comprising:
   forming the air bearing surface of the magnetic head, the air bearing surface being a surface of the magnetic head which is closest to the magnetic medium when the magnetic head is in use;
   forming the adhesive film above the air bearing surface of the magnetic head, the adhesive film being formed under the water vapor partial pressure, wherein the adhesive film comprises $SiN_xO_yH_z$, wherein x, y, and z have a relationship such that a concentration of O is in the range from greater than about 5% to about 13% and a concentration of H is in the range from greater than about 6% to about 12%; and
   forming the protective film above the adhesive film, the protective film comprising carbon.

8. The magnetic head as recited in claim 1, wherein the protective film comprises diamond-like carbon (DLC) having a characteristic of being formed above the adhesive layer of $SiN_xO_yH_z$.

9. The magnetic head as recited in claim 8, wherein the characteristic of being formed above the adhesive layer of $SiN_xO_yH_z$ is a ratio of sp3 bonds to sp2 bonds in the DLC being about 35% or greater.

10. The method as recited in claim 7, wherein the protective film is more wear resistant than a protective film of the same material formed above an adhesive layer of silicon nitride that does not have a characteristic of being formed under a water vapor partial pressure.

11. The method as recited in claim 7, wherein x, y, and z have a relationship such that a concentration of O is in the range from greater than about 10% to about 13% and a concentration of H is in the range from greater than about 10% to about 12%.

12. The method as recited in claim 7, wherein x, y, and z have a relationship such that a concentration of O is about 13% and a concentration of H is about 12%.

13. The method as recited in claim 7, wherein the protective film comprises diamond-like carbon (DLC), wherein a concentration of oxygen in the DLC is greater than about 5% and a concentration of hydrogen in the DLC is greater than about 6%.

14. The method as recited in claim 7, wherein the protective film comprises diamond-like carbon (DLC), wherein a concentration of oxygen in the DLC is greater than about 8% and a concentration of hydrogen in the DLC is greater than about 10%.

15. The method as recited in claim 7, wherein the protective film comprises diamond-like carbon (DLC), wherein a concentration of oxygen in the DLC is about 8% and a concentration of hydrogen in the DLC is about 15%.

16. The method as recited in claim 7, wherein the adhesive film is formed in a gas mixture comprising about 60% partial pressure of argon, about 39% partial pressure of nitrogen, and about 1% partial pressure of water vapor.

17. The method as recited in claim 16, wherein the adhesive film is formed using at least one of: reactive sputtering and ion beam assisted sputtering.

18. The method as recited in claim 7, wherein the protective film is formed in a gas mixture comprising about 60% partial pressure of argon, about 39% partial pressure of nitrogen, and about 1% partial pressure of water vapor.

19. The method as recited in claim 18, wherein the protective film is formed using at least one of: reactive sputtering, laser ablation, cathodic vacuum arc discharge deposition, and mass selective ion beam deposition.

20. The method as recited in claim 7, wherein the adhesive film has a density from about 2.6 g/cm$^3$ to about 2.8 g/cm$^3$.

21. The method as recited in claim 7, wherein the adhesive film has a density of about 2.7 g/cm$^3$ and a hardness of about 19.5 GPa.

22. The method as recited in claim 13, wherein the protective film has a ratio of sp3 bonds to sp2 bonds of about 35% or greater.

* * * * *